(12) United States Patent
Kessler et al.

(10) Patent No.: US 6,750,272 B2
(45) Date of Patent: Jun. 15, 2004

(54) CATALYZED REINFORCED POLYMER COMPOSITES

(75) Inventors: Michael R. Kessler, Urbana, IL (US); Scott R. White, Champaign, IL (US); Benjamin D. Myers, Phoenix, AZ (US)

(73) Assignee: Board of Trustees of University of Illinois, Urbana, IL (US)

( * ) Notice: Subject to any disclaimer, the term of this patent is extended or adjusted under 35 U.S.C. 154(b) by 0 days.

(21) Appl. No.: 09/892,221

(22) Filed: Jun. 25, 2001

(65) Prior Publication Data

US 2002/0198342 A1 Dec. 26, 2002

(51) Int. Cl.⁷ .............................. C08K 9/10; C08F 4/44
(52) U.S. Cl. ..................... 523/211; 524/554; 526/161; 526/171; 526/283
(58) Field of Search .................. 526/170, 171, 526/172, 282, 283, 161; 524/554; 523/211

(56) References Cited

U.S. PATENT DOCUMENTS

| | | |
|---|---|---|
| 4,301,306 A | 11/1981 | Layer |
| 4,324,717 A | 4/1982 | Layer |
| 4,380,617 A | 4/1983 | Minchak et al. |
| 4,708,969 A | 11/1987 | Leach |
| 4,758,400 A | 7/1988 | Dunnavant et al. |
| 4,804,427 A | 2/1989 | Paul et al. |
| 4,902,560 A | 2/1990 | Silver |
| 4,943,621 A | 7/1990 | Janda et al. |
| 5,063,103 A | 11/1991 | Sugawara et al. |
| 5,312,940 A | 5/1994 | Grubbs et al. |
| 5,342,909 A | 8/1994 | Grubbs et al. |
| 5,427,880 A | 6/1995 | Tamura et al. |
| 5,561,173 A | 10/1996 | Dry |
| 5,575,841 A | 11/1996 | Dry |
| 5,660,624 A | 8/1997 | Dry |
| 5,803,963 A | 9/1998 | Dry |
| 5,840,238 A | 11/1998 | Setiabudi et al. |
| 5,958,325 A | 9/1999 | Seemann, III et al. |
| 5,989,334 A | 11/1999 | Dry |
| 6,001,909 A | 12/1999 | Setiabudi |
| 6,040,363 A * | 3/2000 | Warner et al. .............. 523/214 |
| 6,048,488 A | 4/2000 | Fink et al. |
| 6,075,072 A | 6/2000 | Guilbert et al. |
| 6,100,323 A * | 8/2000 | Setiabudi et al. ........... 524/430 |
| 6,261,360 B1 | 7/2001 | Dry |

FOREIGN PATENT DOCUMENTS

| | | |
|---|---|---|
| EP | 0 424 833 B1 | 1/1996 |
| WO | WO 93/20111 | 10/1993 |
| WO | WO 96/16100 | 3/1996 |
| WO | WO 96/20235 | 7/1996 |

OTHER PUBLICATIONS

Stevens, M.P. *Polymer Chemistry*, 1999, pp. 184–186.
Stevens, M.P. *Polymer Chemistry*, 1999, pp. 378–381.

(List continued on next page.)

(57) ABSTRACT

A method for making a fiber-reinforced composite comprises dispensing a reactive liquid into a mold. The mold comprises fibers and a single-component activator on the fibers. The reactive liquid comprises a cyclic olefin, and the mold comprises fibers and a single-component ROMP activator on the fibers. Composites formed by the method may have high fiber densities.

22 Claims, 4 Drawing Sheets

OTHER PUBLICATIONS

Dry, C. and McMillan, W. *Three-part methylmethacrylate adhesive system as an internal delivery system for smart responsive concrete*, 1996, 297–300.

Dry, C. *Smart Mater. Struct.* 1994, 3, 118–123.

Dry, C. *Composite Structures* 1996, 35, 263–269.

Dry, C. and Sottos, N.R *SPIE* vol. 1916, 438–444.

Jung, D. et al. *MD–Vol 80, Composites and Functionally Graded Materials, ASME 1997*, 265–275.

Beckwith, S.W. and Hyland, C.R. *SAMPE Journal* 1998, 34/6, 7–19.

Grubbs, R.H. and Chang, S. *Tetrahedron* 1998, 54, 4413–4450.

Dias, E.L. et al. *J. Am. Chem. Soc.* 1997, 119, 3887–3897.

Breslow, D.S. *Prog. Polym. Sci.* 1993, 18, 1185–1195.

Dias, E.L. and Grubbs, R.H. *Organmetallics* 1997, 17, 2758–2767.

Weck, M. et al. *Macromolecules* 1997, 30, 6430–6437.

Fraser, C. and Grubbs, R.H. *Macromolecules* 1995, 28, 7248–7255.

Bazan, G.C. et al. *Macromolecules* 1991, 24, 4495–4502.

Li, Victor C. et al. *Composites Part B* 1998, 29B, 819–827.

\* cited by examiner

*Primary Examiner*—Robert D. Harlan
(74) *Attorney, Agent, or Firm*—Brinks Hofer Gilson & Lione

CATALYZED REINFORCED POLYMER COMPOSITES

FEDERALLY SPONSORED RESEARCH OR DEVELOPMENT

The subject matter of this application may in part have been funded by the Air Force (AFOSR Grant no. F49620-00-1-0094/White). The government may have certain rights in this invention.

BACKGROUND

Reinforced composite materials are widely used as structural materials for aerospace, automotive, and construction applications. These materials can provide desirable properties, such as high stiffness and strength. Composites typically include a continuous matrix phase, usually a polymeric material or a ceramic, and a reinforcement phase. The reinforcement phase can be made of inorganic materials, including metals, ceramics, and glasses; or organic materials, including organic polymers and carbon fibers. Particularly good properties are obtained when the reinforcement phase contains fibrous materials.

The manufacture of fiber-reinforced composites involves the combination of the fiber reinforcement and a liquid precursor to the matrix in a mold, followed by solidification of the liquid and formation of the matrix. This solidification can be the result of chemical reactions, in which case the liquid precursor is referred to as a reactive liquid. Alternatively, the solidification can be a physical process, for example the cooling of a thermoplastic polymer below its melting temperature.

Although the reinforcing fibers may be present in the liquid precursor prior to dispensing, better properties are typically obtained when the fibers are initially present in the mold as a preform. The liquid is then dispensed into the mold such that the final matrix fills the mold and surrounds the fibers. Preforms may be arranged as mats or meshes, and the fibers within the preform may be randomly oriented or may be oriented in one or more directions. The performance of composites is influenced by many factors, including the amount of reinforcement present relative to the matrix, referred to as fiber loading, and the degree of contact between the fibers and the matrix. Both strength and stiffness tend to be improved by an increase in fiber loading and by increased contact between the phases.

To ensure sufficient contact between the fibers and the matrix, it is desirable to use a liquid precursor which has a low viscosity. Reactive liquids are usually preferred over thermoplastics due to the low viscosity of liquids relative to polymer melts. The reactive liquid is typically a multi-component mixture; for example, the reactive liquid may contain a monomer and an activator which will cause the monomer to polymerize into a solid polymer matrix. The reactive liquid may contain more than one type of monomer, such that a reaction between the monomers produces the solid polymer matrix. Reactions between different monomers may also be facilitated by an activator.

Multi-component reactive liquids typically require complex equipment and procedures for storing and mixing the ingredients and for metering and dispensing the liquid into the mold. The ingredient ratios, mixing times, and holding temperatures are precisely controlled. The components must be thoroughly mixed so that complete reaction occurs throughout the final solid composite. Also, the mixing as well as the dispensing should be sufficiently rapid to prevent the reactive liquid from solidifying before it has filled the mold. Once the reactive liquid is ready for molding, it cannot be stored unless special precautions are taken to inhibit reactions between the ingredients. These precautions include the addition of reaction inhibitors and maintaining the liquid below a critical temperature.

For example, fiber-reinforced epoxy systems and polyurethane systems involve the use of more than one reactive monomer, and require mixing immediately before dispensing into the mold, as described in U.S. Pat. No. 4,804,427. Alternatively, fiber-reinforced vinyl ester and polyester systems involve the addition of an activator to the liquid monomer (U.S. Pat. No. 4,758,400). Fiber-reinforced poly (cycloolefin) systems typically employ two-component activators. One component of the activator is present in the monomer mixture, and the other component is added to this mixture immediately before the liquid is dispensed into the mold.

In reaction injection molding (RIM) processes, two or more reactive components are mixed together, starting the reaction between the components before the mixture is dispensed into the mold. This tends to increase the viscosity of the liquid that is dispensed due to an increase in molecular weight of the polymers or pre-polymers formed in the initial reaction. An increased viscosity can prohibit complete filling of the mold and permeation of the preform, and this tends to decrease the adhesion between the matrix and the fibers. Poor interfacial adhesion between the reinforcement and matrix phase can cause a material to have less than desirable stiffness and strength.

A variety of methods have been developed to alleviate this problem when using multi-component reactive liquids, but these methods generally increase the cost and complexity of the process. For example, the mixture of monomer and activator may be maintained below a critical temperature for reaction during the mixing and dispensing, and then the temperature of the mold can be raised above the critical temperature. The viscosity can be lowered by heating the liquid or by diluting it with a solvent. The speed of the dispensing stage can be increased by raising the injection pressure and/or by applying vacuum to the mold. In some cases, extra ingredients are employed to moderate the reaction so that complete reaction cannot occur until the material has filled the mold. These modifications to the process can provide for an increase in fiber loadings from 20–40% by volume (vol %) to 50–60 vol %.

There is thus a need for a process for making reinforced composites in which the reactive liquid feedstock does not need to be mixed, formulated, and/or metered prior to dispensing into the mold. The resulting composites will ideally contain high loadings of reinforcing materials such as fibers, have good adhesion between the fibers and the matrix, and exhibit structural properties similar to or better than the properties of composites made from conventional multicomponent systems.

BRIEF SUMMARY

In a first aspect, the present invention is a method for making a fiber-reinforced composite, comprising: dispensing a reactive liquid into a mold. The mold comprises fibers and a single-component activator on the fibers.

In a second aspect, the present invention is a method for making a fiber-reinforced composite, comprising: dispensing a reactive liquid into a mold. The reactive liquid comprises a cyclic olefin, and the mold comprises fibers and a single-component ROMP activator on the fibers.

In a third aspect, the present invention is a preform for a fiber-reinforced composite, comprising: fibers and a single-component ROMP activator on the fibers.

In a fourth aspect, the present invention is a method of making a preform, comprising: contacting a plurality of fibers with a mixture comprising a single-component ROMP activator.

In a fifth aspect, the present invention is a fiber-reinforced composite prepared by any of the above methods.

In a sixth aspect, the present invention is a fiber-reinforced composite comprising: a poly(cycloolefin) matrix, a metal, and fibers. The metal is ruthenium or osmium, and the fibers are present in an amount of 40 vol % to 80 vol %.

DETAILED DESCRIPTION

Figure 1:
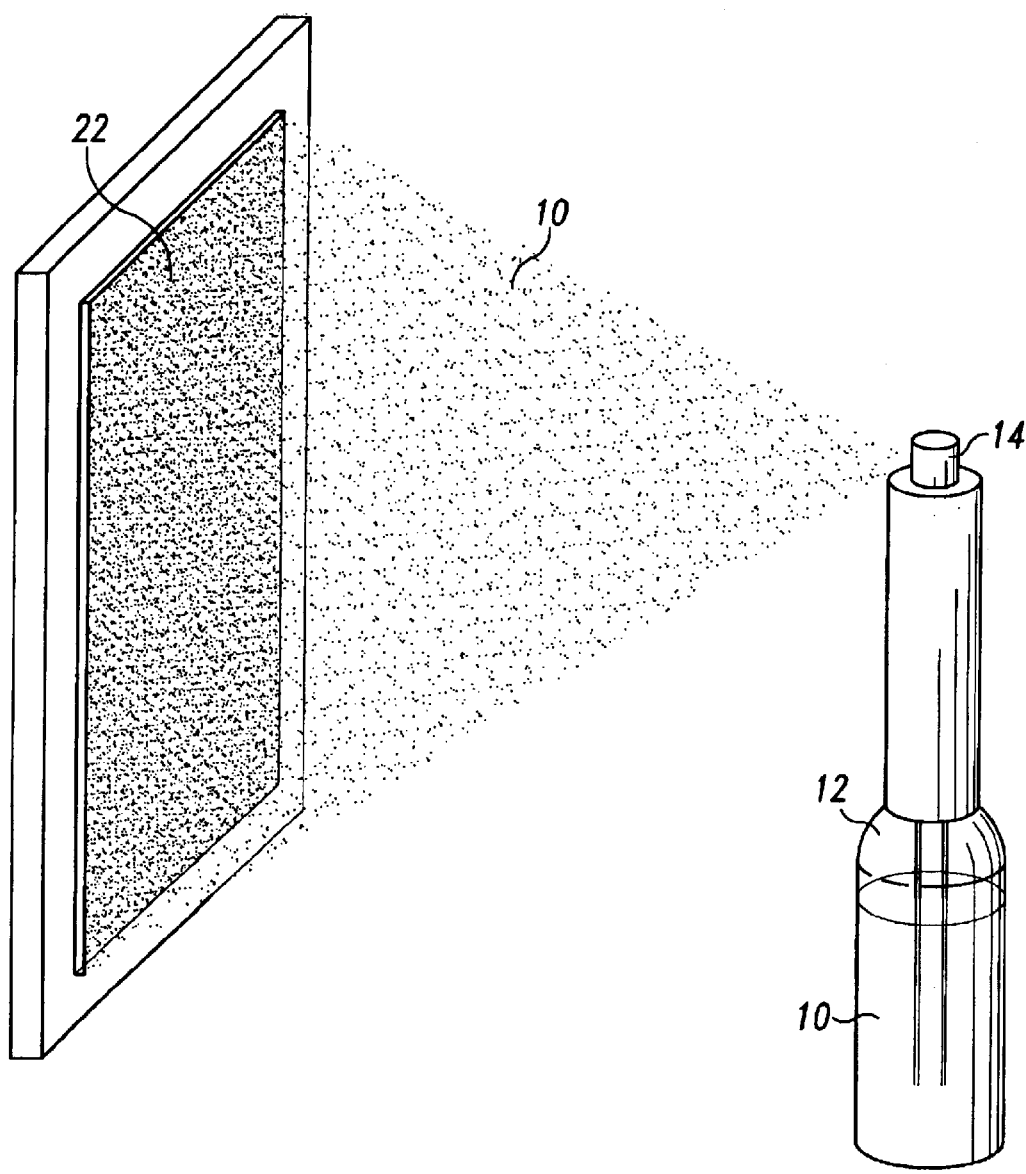
FIG. 1 is a diagram of a process for depositing an activator onto a preform.

The present invention includes a process for molding a composite using a reactive liquid and a solid activator deposited onto a reinforcing material which is placed inside the mold. The reactive liquid does not need to be mixed immediately prior to dispensing the liquid into the mold. The low viscosity of the reactive liquid allows for high fiber loadings in fiber-reinforced composite materials.

A reactive liquid is defined as a liquid substance which can undergo a chemical reaction to form a solid object. This reaction may involve polymerization and/or network formation. Polymerization is the reaction of chemical building blocks to form long chains of repeating units, which are derivatives of the building blocks. These building blocks may be, for example monomers, oligomers, or pre-polymers. A network is a material which has sufficient linkages between repeating units such that the material is crosslinked. A network may be formed from monomers, oligomers, or pre-polymers, or may be formed from polymers through chemical bonding of the chains to each other.

An activator is defined as anything that, when contacted or mixed with the appropriate reactive liquid, will result in the reaction and solidification of that liquid. The activator may be consumed stoichiometrically in the reaction or may act as a catalyst. An activator may be provided as a discrete chemical species. Alternatively, an activator may be provided as more than one species; these species, referred to as activator components, together function as an activator.

A reinforcing material is a component of a composite material which is separate from the matrix phase. One example of reinforcing material is reinforcing fibers, which have an aspect ratio (width:length) of at least 1:5.

Poly(cycloolefin) systems are particularly useful in the present invention. Poly(cycloolefins) may be formed by the interaction of a cyclic olefin with a ring opening metathesis polymerization (ROMP) activator. A cyclic olefin is defined as a compound which contains a carbon—carbon double bond as part of the ring structure. The resulting polymers or networks can be tough and rigid, and can also exhibit excellent chemical resistance. However, for many high performance applications, even higher stiffness and strength are desirable. In such applications, it is desirable to provide for fiber reinforcement of the material as described.

Increased reinforcement density can provide for extremely high stiffness and strength in poly(cyloolefin) composites. An important factor in achieving high fiber loadings is the viscosity of the reactive liquid. The reactive liquid preferably has a viscosity which is sufficiently low to allow the liquid to be dispensed into the mold and to completely fill the mold as well as the spaces surrounding the reinforcement phase. Preferably, the viscosity of the reactive liquid at ambient temperature is less than 100 centipoise (cps). More preferably, the viscosity of the reactive liquid at ambient temperature is less than 50 cps. Even more preferably, the viscosity of the reactive liquid at ambient temperature is less than 10 cps. Even more preferably, the viscosity of the reactive liquid at ambient temperature is less than 1.0 cps.

The reactive liquid preferably does not contact the ROMP activator until the liquid is dispensed into the mold. By avoiding any polymerization prior to dispensing into the mold, the reactive liquid can maintain its desirably low viscosity. These liquids can effectively permeate the fiber preform, even at high fiber concentrations. Preferably, the fiber loading in the final composite is at least 36 vol %. More preferably, the fiber loading in the final composite is from 40 vol % to 80 vol %. Even more preferably, the fiber loading in the final composite is from 60 vol % to 70 vol %. The use of additional ingredients such as diluents or reaction rate modifiers to reduce the viscosity is not required. Also, it is not necessary to mix the ingredients of the reactive liquid immediately before dispensing, nor is it necessary to regulate the temperature of the individual ingredients or of the mixing process. Preferably, the pressure applied to dispense the reactive liquid into a mold is from 100 to 1500 pounds per square inch (psi). In summary, special handling, mixing, and dispensing conditions are not required since the reactive liquid may be directly dispensed into the mold.

The preferred reactive liquids are cyclic olefin monomers. The rings in the cyclic olefin may be a strained or unstrained, and the olefins may be monocyclic, bicyclic, or multicyclic. The olefin monomers may be substituted so as to contain one or more functional groups. Suitable cyclic olefin monomers include monomers described in U.S. Pat. Nos. 4,943,621; 4,324,717; and No. 4,301,306. Preferred cyclic olefin monomers include norbornene-type monomers, characterized by the presence of at least one norbornene group which can optionally be substituted. Suitable norbornene type monomers include substituted norbornenes and unsubstituted norbornene, dicyclopentadiene, di(methyl) dicyclopentadiene, dihydrodicyclopentadiene, cyclopentadiene trimers, tetramers of cyclopentadiene, tetracyclododecene, and substituted tetracyclododecenes. Common norbornene-type monomers can be represented by the following formula:

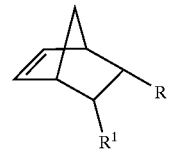

wherein R and $R^1$ may independently be hydrogen or a group which may be halogen, alkyl, alkenyl, cycloalkyl, cycloalkenyl, or aryl; or R and $R^1$ together may form saturated or unsaturated cyclic groups of from 4 to 40 carbon atoms.

"Alkyl" (or alkyl- or alk-) refers to a substituted or unsubstituted, straight, branched or cyclic hydrocarbon chain, preferably containing from 1 to 20 carbon atoms. More preferred alkyl groups are alkyl groups containing from 7 to 16 carbon atoms. Preferred cycloalkyls have from 3 to 10, preferably 3–6, carbon atoms in their ring structure. Suitable examples of unsubstituted alkyl groups include methyl, ethyl, propyl, isopropyl, cyclopropyl, butyl, isobutyl, tert-butyl, sec-butyl, cyclobutyl, pentyl, cyclopentyl, hexyl, cyclohexyl, and the like. "Alkylaryl" and "alkylheterocyclic" groups are alkyl groups covalently bonded to an aryl or heterocyclic group, respectively.

"Alkenyl" refers to a substituted or unsubstituted, straight, branched or cyclic, unsaturated hydrocarbon chain that contains at least one double bond, and preferably 2 to 20, more preferably 7 to 16, carbon atoms. Exemplary unsubstituted alkenyl groups include ethenyl (or vinyl)(—CH=CH$_2$), 1-propenyl, 2-propenyl (or allyl)(—CH$_2$—CH=CH$_2$), 1,3-butadienyl (—CH=CHCH=CH$_2$), 1-butenyl (—CH=CHCH$_2$CH$_3$), hexenyl, pentenyl, 1, 3, 5-hexatrienyl, and the like. Preferred cycloalkenyl groups contain five to eight carbon atoms and at least one double bond. Examples of cycloalkenyl groups include cyclohexadienyl, cyclohexenyl, cyclopentenyl, cycloheptenyl, cyclooctenyl, cyclohexadienyl, cycloheptadienyl, cyclooctatrienyl and the like.

"Alkynyl" refers to a substituted or unsubstituted, straight, branched or cyclic unsaturated hydrocarbon chain containing at least one triple bond, and preferably 2 to 20, more preferably 7 to 16, carbon atoms.

"Aryl" refers to any monovalent aromatic carbocyclic or heteroaromatic group, preferably of 3 to 10 carbon atoms. The aryl group can be monocyclic (i.e. phenyl (or Ph)) or polycyclic (i.e. naphthyl) and can be unsubstituted or substituted. Preferred aryl groups include phenyl, naphthyl, tolyl, benzylidenyl, benzonitrile, furyl, thienyl, thiophenyl, pyridyl, indolyl, quinolinyl or isoquinolinyl.

"Heterocyclic" refers to a stable, saturated, partially unsaturated, or aromatic ring, preferably containing 5 to 10, more preferably 5 or 6, atoms. The ring can be substituted 1 or more times (preferably 1, 2, 3, 4 or 5 times) with a substituent. The ring can be mono-, bi- or polycyclic. The heterocyclic group consists of carbon atoms and from 1 to 3 heteroatoms independently selected from the group consisting of nitrogen, oxygen, and sulfur. The heteroatoms can be protected or unprotected. Examples of useful heterocyclic groups include substituted or unsubstituted, protected or unprotected acridine, benzathiazoline, benzimidazole, benzofuran, benzothiophene, benzothiazole, benzothiophenyl, carbazole, cinnoline, furan, imidazole, 1H-indazole, indole, isoindole, isoquinoline, isothiazole, morpholine, oxazole (i.e. 1,2,3-oxadiazole), phenazine, phenothiazine, phenoxazine, phthalazine, piperazine, pteridine, purine, pyrazine, pyrazole, pyridazine, pyridine, pyrimidine, pyrrole, quinazoline, quinoline, quinoxaline, thiazole, 1,3,4-thiadiazole, thiophene, 1,3,5-triazines, triazole (i.e. 1,2,3-triazole), and the like.

"Functional group" refers to any moiety of a molecule which has a characteristic behavior. Suitable functional groups include, for example, hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen.

"Halogen" (or halo-) refers to fluorine, chlorine, iodine or bromine. The preferred halogen is fluorine or chlorine.

"Substituted" means that the moiety contains at least one, preferably 1–3 substituent(s). Suitable substituents include hydroxyl (—OH), amino (—NH$_2$), oxy (—O—), carbonyl (>C=O), thiol, alkyl, alkenyl, alkynyl, alkoxy (—O—C—), halo, nitrile, nitro, aryl, and other functional groups. These substituents can optionally be further substituted with 1–3 substituents. Examples of substituted substituents include carboxamide, alkylmercapto, alkylsulphonyl, alkylsulphinyl, alkylnitrile, alkylamino, dialkylamino, carboxylate, alkoxycarbonyl, alkylaryl, aralkyl, alkylheterocyclic, and the like.

In a preferred embodiment, the cyclic olefin is cyclobutene, dimethyl dicyclopentadiene, cyclopentene, cycloheptene, cyclooctene, cyclononene, cyclodecene, cyclooctadiene, cyclononadiene, cyclododecene, norbornene, norbornadiene, 7-oxanorbornene, 7-oxanorbornadiene, or dicyclopentadiene; each of which may be substituted or unsubstituted. In a more preferred embodiment, the cyclic olefin is dicyclopentadiene, norbornene, cyclooctene, cyclooctadiene, or substituted derivatives thereof. In an even more preferred embodiment, the cyclic olefin is dicyclopentadiene (DCPD).

Preferably the reactive liquid contains a multifunctional cyclic olefin. Multifunctional cyclic olefins contain two or more double bonds which can undergo ROMP. The reactive liquid may contain other ingredients, including other cyclic olefins which may be present as comonomers. These comonomers may be multifunctional or may have a single double bond. The properties of the final composite can be controlled by the selection of different combinations of monomers. The reactive liquid may contain other ingredients which affect the final properties of the composite. These ingredients include, for example stabilizers, colorants, fillers, flame retardants, and plasticizers.

The preferred activators are ROMP activators. Many compounds of the titanium, vanadium, molybdenum, tungsten, rhenium, iridium, ruthenium and osmium transition metals are known to be activators for ROMP. These include, for example, complex metal halides, metal carbenes, and coordination catalysts of the Ziegler-Natta type. In principle, all these known ROMP activators can be used. Because the use of absolutely anhydrous substances and apparatus requires additional expenditure, it is preferred to use ROMP activators which are unaffected by moisture. These activators include carbene complexes of ruthenium or osmium and compounds of tungsten, molybdenum or tantalum in combination with organic compounds of tin or lead.

It is also preferred that the activator is a single species rather than a combination of activator components (multi-component activator). The use of multi-component activators typically requires control over the ratios of the activator components to ensure precise stoichiometry of the individual components. This control necessitates precise mixing and metering of the reactive liquid. Examples of multi-component activators are described in U.S. Pat. No. 5,063,103 and in EP 424,833 B1 and include the compounds of tungsten, molybdenum or tantalum in combination with organic compounds of tin or lead as mentioned above.

Examples of single-component activators include alkylidene complexes of molybdenum or tungsten (Schrock activators) and carbene complexes of ruthenium or osmium (Grubbs activators). Schrock activators tend to exhibit low stability to air and moisture, reducing their usefulness since particular environmental conditions must be maintained.

Although Grubbs activators are desirable due to their stability to air and to aqueous environments, they tend to exhibit low catalytic activity, which could lead to processing concerns. For example, if the polymerization and/or network formation could not be completed, the polymer matrix would not have optimum crosslink density or molecular weight, possibly resulting in a material that has less than ideal strength and stiffness. Also, low catalytic activity could result in long process times for network formation, possibly increasing cycle times for production or resulting in a need to heat the system during the molding process. In order to ensure complete reaction using these activators, it has often been necessary to heat the mold and/or to use additional ingredients to aid network formation, as described in U.S. Pat. Nos. 6,100,323; 6,001,909; and 5,840,238. Surprisingly, in the present invention, it has been found that the molding of cyclic olefins in the presence of Grubbs activators deposited on fiber reinforcements produces composites with desirable properties.

The preferred activators include ruthenium and osmium carbene complexes. Suitable ruthenium and osmium carbene complex activators, the methods of synthesizing such activators, suitable olefin monomers, and the methods for performing and controlling the polymerization reaction, are disclosed in U.S. Pat. Nos. 5,312,940 and 5,342,909. Preferably, ruthenium or osmium carbene complex activators are represented by the formula:

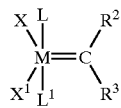

where M is Os or Ru; $R^2$ and $R^3$ may independently be hydrogen, alkyl, alkenyl, alkynyl, or aryl; X and $X^1$ may independently be hydrogen or any anionic moiety; and L and $L^1$ may independently be any neutral electron donor. An anionic moiety is any moiety which, when removed from the metal center, has a negative charge. A neutral electron donor is any moiety which, when removed from the metal center, has a neutral charge.

Preferably, $R^2$ and $R^3$ are independently hydrogen, aryl, or vinyl. Preferably, X and $X^1$ are independently halogen, hydrogen, alkyl, or aryl. More preferably, X and $X^1$ are independently Cl, $CF_3CO_2$, $CH_3CO_2$, $CFH_2CO_2$, $(CH_3)_3CO$, $(CF_3)_2(CH_3)CO$, $(CF_3)(CH_3)_2CO$, $BF_4$, $PF_6$, $SbF_6$, $AsF_6$, $CF_3SO_3$, $C_6H_5SO$, cyclopentadieny, $C_6H_5O$, $CH_3O$, $CH_3$, $CH_2O$, tosylate, mesylate, methylphenylsulfonate, or trifluoromethanesulfonate. Even more preferably, X and $X^1$ are both Cl. Preferably, L and $L^1$ are independently phosphines, sulfonated phosphines, phosphites, phosphinites, phosphonites, arsines, stibines, ethers, amines, amides, sulfoxides, carboxyls, nitrosyls, pyridines, or thioethers. Even more preferably, L and $L^1$ are independently phosphines of the formula $PR^4R^5R^6$ where $R^4$, $R^5$ and $R^6$ are independently aryl, $C_1$–$C_{10}$ primary alkyl, secondary alkyl, or cycloaklyl. Most preferably, L and $L^1$ are independently —$P(cyclohexyl)_3$, —$P(cyclopentyl)_3$, —$P(isopropyl)_3$, or —$P(phenyl)_3$.

A preferred group of catalysts includes those in which M is Ru; $R^2$ and $R^3$ are independently hydrogen, aryl, or vinyl; X and $X^1$ are Cl; and L and $L^1$ are triphenylphosphines or trialkylphosphines such as tricyclopentylphosphine, tricyclohexylphosphine, and triisopropylphosphine. The aryl and vinyl may each be substituted with one or more groups including $C_1$–$C_5$ alkyl; halide; $C_1$–$C_5$ alkoxy; a phenyl group which may be optionally substituted with one or more halide, $C_1$–$C_5$ alkyl, or $C_1$–$C_5$ alkoxy groups; and one or more functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen.

Particularly preferred catalysts can be represented by the formulas:

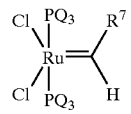

where Q is cyclopentyl, cyclohexyl, or phenyl, and $R^7$ is aryl. The most preferred activator is where Q is cyclohexyl and $R^6$ is phenyl.

The activator is preferably deposited onto the fiber preform. This deposition can be accomplished by a variety of methods, including dipping the fibers into a solution of the activator and spraying the fibers with a solution of the activator. It is desirable that the solvent of the activator solution is sufficiently volatile to allow for evaporation of the solvent, leaving behind a deposit of the activator. Examples of solvents that are useful include aliphatic and cycloaliphatic hydrocarbons such as pentane, hexane, heptane, octane, cyclohexane, cyclohexene, and cyclooctane; aromatic hydrocarbons such as benzene, toluene, and naphthalene; and substituted hydrocarbons such as dichloromethane, chloroform, chlorobenzene, and dichlorobenzene, diethyl ether, tetrahydrofuran, dioxane, ethyl acetate, acetone, methyl ethyl ketone, and methyl isobutyl ketone.

Examples of fibers which are useful in the invention include glass fiber, such as E-glass and S-glass; graphite; carbon fiber, such as Thornel 25 and Modmor; boron; aramid, such as Kevlar 49; polymer fibers, such as polyester, nylon, and rayon; silica; tungsten; and beryllium and its alloys. The fibers may be present in a variety of preform types. For example, the fibers may be present as rovings; chopped-strand mat; continuous-strand mat; textile yarn; or fabric roving.

Figure 2:
FIG. 2 is a view of reactive fibers.

In applying the activator to the fibers, it is preferred that the fibers are sprayed with a solution of the activator in acetone. A diagram of this procedure is given in FIG. 1. The activator solution 10 may be in a container 12 equipped with a spray nozzle 14. The spray may be applied manually, for example using a hand-operated plunger or pump. Alternatively, the spray may be applied automatically, for example using a motor-driven pump, a spray boom, or a size press. The concentration of the activator solution is preferably from 0.1 millimolar (mM) to 500 mM. The activator may form a continuous layer on the surface of the fibers 22, and this layer may provide complete or partial coverage of the surface. Alternatively, the activator may form a plurality of isolated deposits on the fibers. The activator layer or deposits may be crystalline or amorphous. An example of fibers coated with deposits of an activator is illustrated in FIG. 2. Due to the presence of an active activator on the surface, fibers which have been treated with the activator solution are referred to as reactive fibers.

Preferably the amount of activator deposited on the fibers is controlled by varying the concentration of the solution and or the amount of solution applied. More preferably, the amount of activator provides for a ratio of activator to monomer from 1:100 to 1:1,000,000. Even more preferably, the ratio of activator to monomer is from 1:2,000 to 1:200,000.

The reactive fibers may be placed in the mold individually or as a preform. The number of fibers and/or preforms and their location within the mold can depend on the desired fiber loading and fiber distribution. It is preferred that the fibers are present in an amount sufficient to provide a loading in the composite of 40 vol % to 80 vol %. The mold may be of any shape, provided there is a continuous cavity when the mold is closed.

Figure 3:
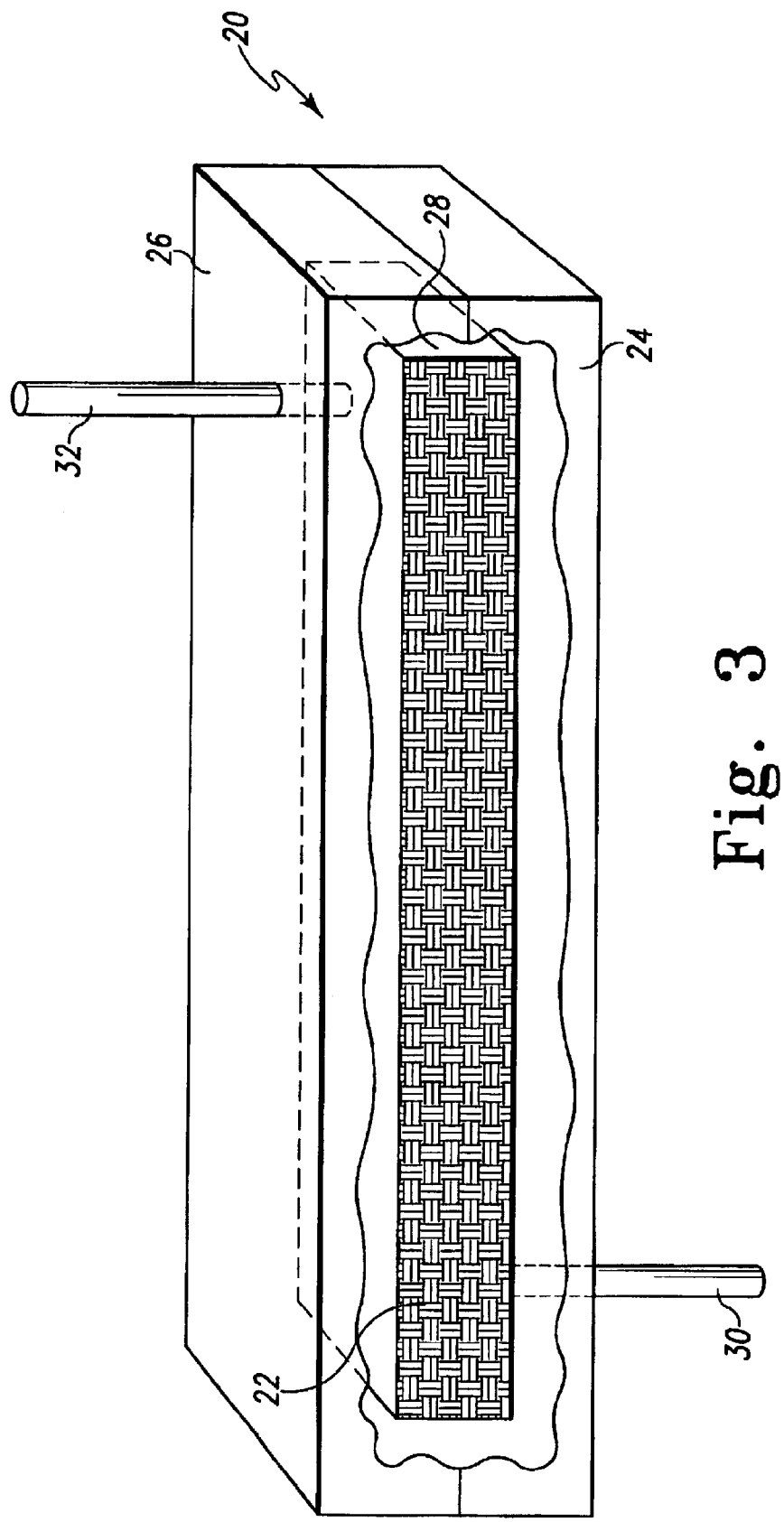
FIG. 3 is a view of an RTM mold.

The mold containing the fibers is closed and then filled with the reactive liquid. Referring to FIG. 3, the mold 20 may have at least two parts 24 and 26 which, when mated together, form a mold cavity 28 containing fibers 22. The mold has an inlet sprue 30 in contact with the mold cavity through which the reactive liquid is dispensed. The mold may also have a vent sprue 32 in contact with the mold cavity through which air may be displaced from the cavity as it is filled with the reactive liquid. The vent sprue may also allow for venting or evacuation of volatile compounds which are present in the reactive liquid or which are formed during the polymerization and curing process.

Figure 4:
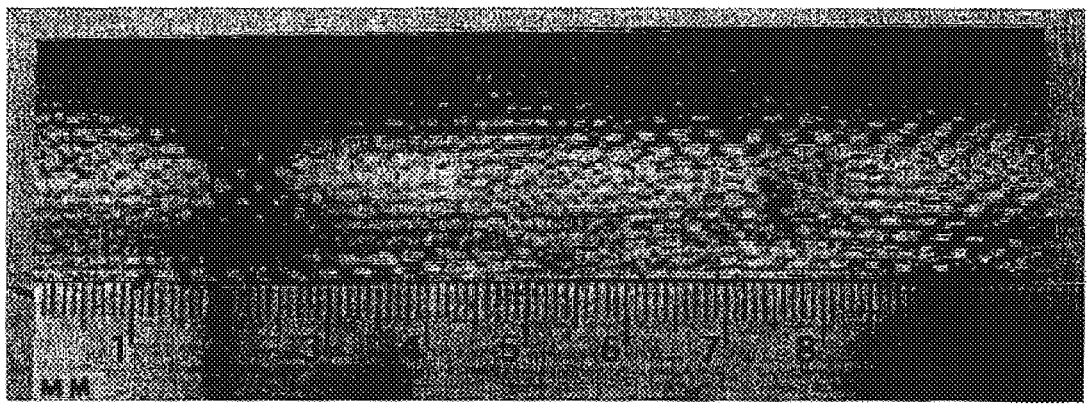
FIG. 4 is a view of a composite material.

Contact between the reactive liquid and the reactive fibers induces polymerization of the reactive liquid. This polymerization may also involve the curing of the polymer into a crosslinked network. Once the composite has solidified the mold is opened, and the molded composite material is removed (see FIG. 4). This process can yield composites with desirable properties without the need for mixing and metering, since no activator components need to be combined with the reactive liquid prior to dispensing. The composites formed by this process may be characterized by presence of the activator or its derivatives in the composite. The presence of ruthienium or osmium from the activator may be conveniently measured by X-ray spectroscopy.

This process also provides for improved control and more processing options in molding composites. For example, the crosslink density of a molded object can be controlled by adjusting the amount of activator that is applied to the fiber preform. A smaller amount of activator can provide for a lower crosslinking density, allowing for a more flexible molded object. In addition, the activator can be applied to the preform in a non-uniform fashion. Thus, the crosslink density can be systematically varied within a single molded object. Another advantage of this process is the ability to mold composites with high loadings of fiber reinforcement.

The composites made by this process are high-strength structural materials having a polymeric matrix reinforced with fibers. The processes of the invention may be used, for example, in resin transfer molding (RTM) and structural reaction injection molding (SRIM). The processes of the invention may also be used in derivatives of these techniques, for example in vacuum-assisted resin transfer molding (VARTM), thermal expansion resin transfer molding (TERTM), resin injection recirculation molding (RIRM), ultimately reinforced thermoset resin injection (URTRI), and Seeman's Composite Resin Infusion Molding Process (SCRIMP™). Beckwith, S. W. Hyland, C. R. SAMPE Journal, 34(6), p.7–19, 1998.

EXAMPLES

The Grubbs catalyst, $Cl_2(P(C_6H_{11})_3)_2Ru(=CHC_6H_5)$, was obtained from STREM CHEMICALS, Newburyport, Mass. Other ROMP activators are synthesized following the procedures of U.S. Pat. Nos. 5,342,909 and 5,312,940.

Example 1

Grubbs catalyst (1.2 g) is dissolved in acetone (500 milliliters) and transferred to a spray bottle. Several layers of plain weave e-glass fabric are cut and sprayed with the catalyst solution. The fabric weighs 25 g before the solution application and 26 g after the application once the preform is dry to the touch.

A two-part aluminum-plexiglass mold with an interior of dimensions 3 cm×8 cm×0.35 cm is used for the RTM process. The lower part of the mould has, on the side at the bottom, an opening of diameter 9 mm connected to the container for the dicyclopentadiene (DCPD) by a channel. A valve is incorporated between the container and the mold. A second opening of diameter 9 mm in the middle of the upper part of the mold is vented to the atmosphere. The preform containing the reactive fibers is laid in the mold. The DCPD (10 g) is transferred into the mold by injecting it through the channel. The flow rate can be regulated by the valve setting. To obtain good impregnation of the preform, the filling time is 30 seconds. The mold is then sealed as the material cures. To ensure full reaction in the mold, the mold is kept in a sealed condition for 120 minutes. The composite bar is then removed from the mold.

The following are prophetic examples:

Prophetic Example 1

A composite bar is made by the process of Example 1, except using $Cl_2(P(C_6H_5)_3)_2Os(=CH—CH=C(C_6H_5)_2)$ as the activator.

Prophetic Example 2

A composite bar is made by the process of Example 1, except using $(F_3CC(=O)O)_2(P(C_6H_5)_3)_2Ru(=CH—CH=C(C_6H_5)_2)$ as the activator.

Prophetic Example 3

A composite bar is made by the process of Example 1, except using a 20 mixture of DCPD and norbornene as the reactive liquid. The relative amounts of the monomers used are 30 wt % and 70 wt % respectively.

Prophetic Example 4

A composite bar is made by the process of Example 1, except using a mixture of DCPD and cyclooctadienene as the reactive liquid. The relative amounts of the monomers used are 30 wt % and 70 wt % respectively.

Prophetic Example 5

A composite bar is made by the process of Example 1, except that the 30 reactive preform was made by dipping the e-glass fabric sample into a bath of the activator solution. The dipping is repeated until the mass of the preform has increased from 25 g to 26 g.

Obviously, numerous modifications and variations of the present invention are possible in light of the above teachings. It is therefore to be understood that within the scope of the appended claims, the invention may be practiced otherwise than as specifically described herein.

What is claimed is:

1. A method for making a reinforced composite, comprising:

dispensing a reactive liquid into a mold;

wherein the mold comprises reinforcing material and a single-component activator on the reinforcing material.

2. The method of claim 1, wherein the reinforcing material comprises fibers.

3. The method of claim 2, wherein the single-component activator is a complex of formula (I):

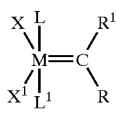

Formula (I)

wherein M is Os or Ru;
R and $R^1$ are independently hydrogen, alkyl; alkenyl, alkynyl, or aryl;
X and $X^1$ are independently hydrogen or any anionic moiety; and
L and $L^1$ are independently any neutral electron donor.

4. The method of claim 3, wherein
M is Ru;
R is hydrogen;
$R^1$ is phenyl;
X and $X^1$ are Cl; and
L and $L^1$ are tricyclohexyl phosphine.

5. The method of claim 2, wherein the single-component activator is prepared by contacting the fiber with a mixture of the activator and a solvent.

6. The method of claim 5, wherein the contacting comprises spraying, and the mixture is a solution of the activator in an organic solvent.

7. The method of claim 6, wherein the concentration of the activator in the solution is from 0.1 millimolar to 500 millimolar.

8. The method of claim 2, wherein the reactive liquid comprises a cycloolefin monomer.

9. The method of claim 8, wherein the reactive liquid comprises dicyclopentadiene.

10. The method of claim 8, wherein the activator and monomer are present in a molar ratio from 1:100 to 1:1,000,000.

11. The method of claim 2, wherein the viscosity of the reactive liquid is less than 10 centipoise.

12. The method of claim 2, comprising a plurality of fibers, wherein the fibers are present in a volume fraction of from 40% to 80%.

13. The method of claim 2, wherein the reactive liquid does not require mixing immediately prior to dispensing into the mold.

14. A method for making a reinforced composite, comprising:
dispensing a reactive liquid into a mold;
wherein the reactive liquid comprises a cyclic olefin, and the mold comprises reinforcing material and a single-component ROMP activator on the reinforcing material.

15. The method of claim 14, wherein the reinforcing material comprises fibers.

16. The method of claim 15, wherein the single-component activator is complex of formula (II):

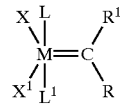

Formula (II)

wherein M is Os or Ru;
R and $R^1$ are independently hydrogen, alkyl, alkenyl, alkynyl, or aryl;
X and $X^1$ are independently hydrogen or any anionic moiety; and
L and $L^1$ are independently any neutral electron donor.

17. The method of claim 16, wherein
M is Ru;
R is hydrogen;
$R^1$ is phenyl;
X and $X^1$ are Cl; and
L and $L^1$ are tricyclohexyl phosphine.

18. The method of claim 15, wherein the single-component activator is prepared by contacting the fiber with a mixture of the activator and a solvent.

19. The method of claim 18, wherein the contacting comprises spraying, and the mixture is a solution of the activator in an organic solvent comprising a concentration of the activator of from 0.1 millimolar to 500 millimolar.

20. The method of claim 15, wherein the reactive liquid comprises dicyclopentadiene.

21. The method of claim 15, wherein the activator and monomer are present in a molar ratio of from 1:100 to 1:1,000,000.

22. The method of claim 17, wherein
the single-component activator is prepared by spraying the fiber with a solution of the activator in an organic solvent comprising a concentration of the activator of from 0.1 millimolar to 500 millimolar;
the reactive liquid comprises dicyclopentadiene;
the activator and monomer are present in a molar ratio from 1:100 to 1:1,000,000; and
the volume fraction of fibers is from 40% to 80%.

\* \* \* \* \*